US008881157B2

(12) United States Patent
Wolfe et al.

(10) Patent No.: US 8,881,157 B2
(45) Date of Patent: Nov. 4, 2014

(54) ALLOCATING THREADS TO CORES BASED ON THREADS FALLING BEHIND THREAD COMPLETION TARGET DEADLINE

(75) Inventors: Andrew Wolfe, Los Gatos, CA (US); Thomas M. Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 649 days.

(21) Appl. No.: 12/557,971

(22) Filed: Sep. 11, 2009

(65) Prior Publication Data

US 2011/0067029 A1 Mar. 17, 2011

(51) Int. Cl.
*G06F 9/46* (2006.01)
*G06F 9/50* (2006.01)

(52) U.S. Cl.
CPC .......................... *G06F 9/505* (2013.01)
USPC ......................................................... 718/102

(58) Field of Classification Search
CPC ........................................................ G06F 9/50
USPC ......................................................... 718/102
See application file for complete search history.

(56) References Cited

U.S. PATENT DOCUMENTS

| | | | |
|---|---|---|---|
| 5,394,548 A | 2/1995 | Nakajima et al. | |
| 5,659,721 A * | 8/1997 | Shen et al. | 712/228 |
| 5,968,115 A | 10/1999 | Trout | |
| 6,243,788 B1 | 6/2001 | Franke et al. | |
| 7,269,713 B2 * | 9/2007 | Anderson et al. | 712/214 |
| 7,318,125 B2 | 1/2008 | Chiang et al. | |
| 7,434,002 B1 | 10/2008 | Zedlewski et al. | |
| 7,437,581 B2 * | 10/2008 | Grochowski et al. | 713/320 |
| 7,461,376 B2 | 12/2008 | Geye et al. | |
| 7,526,661 B2 | 4/2009 | Nakajima et al. | |
| 7,614,056 B1 | 11/2009 | Saxe et al. | |
| 7,890,298 B2 * | 2/2011 | Coskun et al. | 702/186 |
| 7,930,574 B2 | 4/2011 | Cai et al. | |
| 2003/0163648 A1 | 8/2003 | Smith | |
| 2004/0215987 A1 | 10/2004 | Farkas et al. | |
| 2005/0021931 A1 | 1/2005 | Anderson et al. | |
| 2005/0039185 A1 | 2/2005 | Heidari-Bateni et al. | |
| 2005/0086660 A1 | 4/2005 | Accapadi et al. | |

(Continued)

FOREIGN PATENT DOCUMENTS

| | | |
|---|---|---|
| CN | 1239249 A | 12/1999 |
| JP | 2000148518 | 5/2000 |

(Continued)

OTHER PUBLICATIONS

International Search Report and Written Opinion of the International Searching Authority, International Application No. PCT/US2010/37496, mailed on Sep. 21, 2010, 7 pages.

(Continued)

*Primary Examiner* — Meng An
*Assistant Examiner* — James J Lee
(74) *Attorney, Agent, or Firm* — Moritt Hock & Hamroff LLP; Steven S. Rubin, Esq.

(57) ABSTRACT

Techniques are generally described for allocating a thread to heterogeneous processor cores. Example techniques may include monitoring real time computing data related to the heterogeneous processor cores processing the thread, allocating the thread to the heterogeneous processor cores based, at least in part, on the real time computing data, and/or executing the thread by the respective allocated heterogeneous processor core.

16 Claims, 5 Drawing Sheets

(56) References Cited

U.S. PATENT DOCUMENTS

| | | |
|---|---|---|
| 2005/0216775 A1 | 9/2005 | Inoue |
| 2005/0235126 A1* | 10/2005 | Ko et al. ............ 711/170 |
| 2006/0037017 A1 | 2/2006 | Accapadi et al. |
| 2006/0168571 A1 | 7/2006 | Ghiasi et al. |
| 2007/0033592 A1 | 2/2007 | Roediger et al. |
| 2007/0050605 A1 | 3/2007 | Ferren et al. |
| 2007/0074011 A1 | 3/2007 | Borkar et al. |
| 2007/0283358 A1 | 12/2007 | Kasahara et al. |
| 2007/0294693 A1 | 12/2007 | Barham |
| 2008/0244226 A1 | 10/2008 | Li et al. |
| 2008/0250414 A1 | 10/2008 | Brokenshire et al. |
| 2009/0037911 A1 | 2/2009 | Ahuja et al. |
| 2009/0089792 A1* | 4/2009 | Johnson et al. ............ 718/105 |
| 2009/0217277 A1 | 8/2009 | Johnson et al. |
| 2010/0005474 A1* | 1/2010 | Sprangle et al. ............ 718/104 |
| 2010/0077185 A1 | 3/2010 | Gopalan et al. |
| 2010/0268912 A1 | 10/2010 | Conte et al. |
| 2010/0332883 A1* | 12/2010 | Saxe et al. ............ 713/324 |

FOREIGN PATENT DOCUMENTS

| | | | |
|---|---|---|---|
| JP | 2003006175 A | 1/2003 | |
| JP | 2004326175 A | 11/2004 | |
| JP | 2005031771 | 3/2005 | |
| JP | 2006028323 A | 2/2006 | |
| JP | 2006235907 A | 9/2006 | |
| JP | 2007021045 A | 2/2007 | |
| JP | 2007108944 A | 4/2007 | |
| JP | 2007226587 A | 9/2007 | |
| JP | 2007328415 A | 12/2007 | |
| JP | 2008090546 A | 4/2008 | |
| JP | 2008123205 A | 5/2008 | |
| JP | 2010207850 A | 9/2010 | |
| JP | 2011031134 A | 2/2011 | |

OTHER PUBLICATIONS

International Search Report and Written Opinion of the International Searching Authority, International Application No. PCT/US10/37489, mailed on Sep. 20, 2010, 8 pages.

International Search Report and Written Opinion of the International Searching Authority, International Application No. PCT/US10/37498, mailed on Sep. 20, 2010, 7 pages.

Becchi, M. and Crowley, P., et al., "Dynamic Thread Assignment on Heterogeneous Multiprocessor Architectures," ACM, May 3-5, 2006, pp. 29-39, Ischia, Italy.

Bloom. B. H., "Bloom filter," accessed at www.en.wikipedia.org/wiki/Bloom_filter, last modified on Apr. 1, 2012, 12 pages—date retrieved Apr. 2, 2012.

Chen, T. et al., "A Location-Based Mobile Game Engine on the Heterogeneous Multi-Core Processor Architecture," Journal of Computational Information Systems, Jun. 2005, pp. 1-7, vol. 1, Issue. 2, Hong Kong, R.O.C.

Constantinou, T. et al., "Performance Implications of Single Thread Migration on a Chip Multi•Core", ACM SIGARCH Computer Architecture News, Nov. 2005, 12 pages, vol. 33, No. 4, Texas, USA.

European Search Report for European Application No. 10 15 4703, European Patent Office, The Hague, Netherlands, mailed on May 3, 2010.

Kumar, R. et al., "Single-ISA Heterogeneous Multi-Core Architectures for Multithreaded Workload Performance," In Proceedings of the 31st International Symposium on Computer Architecture, IEEE, Jun. 19-23, 2004, 12 pages, Munich, Germany.

Kumar, R., et al., "Processor Power Reduction via Single ISA Heterogenous Multi-Core Architectures," Computer Architecture Letters, 2003, pp. 4, vol. 2, Issue 1.

* cited by examiner

ALLOCATING THREADS TO CORES BASED ON THREADS FALLING BEHIND THREAD COMPLETION TARGET DEADLINE

This application may be related to co-pending U.S. patent application Ser. No. 12/427,602, entitled "THREAD MAPPING IN MULTI-CORE PROCESSORS," filed Apr. 21, 2009, by Wolfe et al., U.S. patent application Ser. No. 12/557,985, entitled "MAPPING OF COMPUTER THREADS ONTO HETEROGENEOUS RESOURCES," filed Sep. 11, 2009, by Wolfe et al., and/or co-pending U.S. patent application Ser. No., 12/557,864, entitled "CACHE PREFILL ON THREAD MIGRATION," filed Sep. 11, 2009, by Wolfe et al., the entire disclosures of which are incorporated herein by reference.

BACKGROUND

The present disclosure is related to multi-core computer systems and, more particularly, to efficiently tuning a thread's core allocation based, at least in part, on real time computing data related to the multi-core computer system.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods, systems, devices and/or apparatus related to multi-core computer systems and, more particularly, to efficient tuning of a thread's core allocation based, at least in part, on real time computing factors related to the multi-core computer system.

The present disclosure contemplates that some computer systems may include a plurality of processor cores. In a multi-core system with heterogeneous hardware, some cores may have certain hardware capabilities not available to other cores. In some example computer systems, at least one thread (which may be a sequence of instructions and which may execute in parallel with other threads) may be assigned to an appropriate core. Thread allocation may be utilized to associate threads with appropriate cores. In some example computer systems, a thread may be reassigned from one core to another core during execution of the thread. While the present disclosure generally refers to threads, it is within the scope of the disclosure to include the mapping of processes, tasks and the like.

In an example embodiment, data associated with threads may be used to determine when a thread should be allocated to another core and/or to which core the thread should be allocated. For example, a system may use real time computing data relating to a thread to determine whether the thread is falling behind a target deadline. If the thread is falling behind the target deadline, the thread may be migrated to a faster core, for example.

Figure 1:
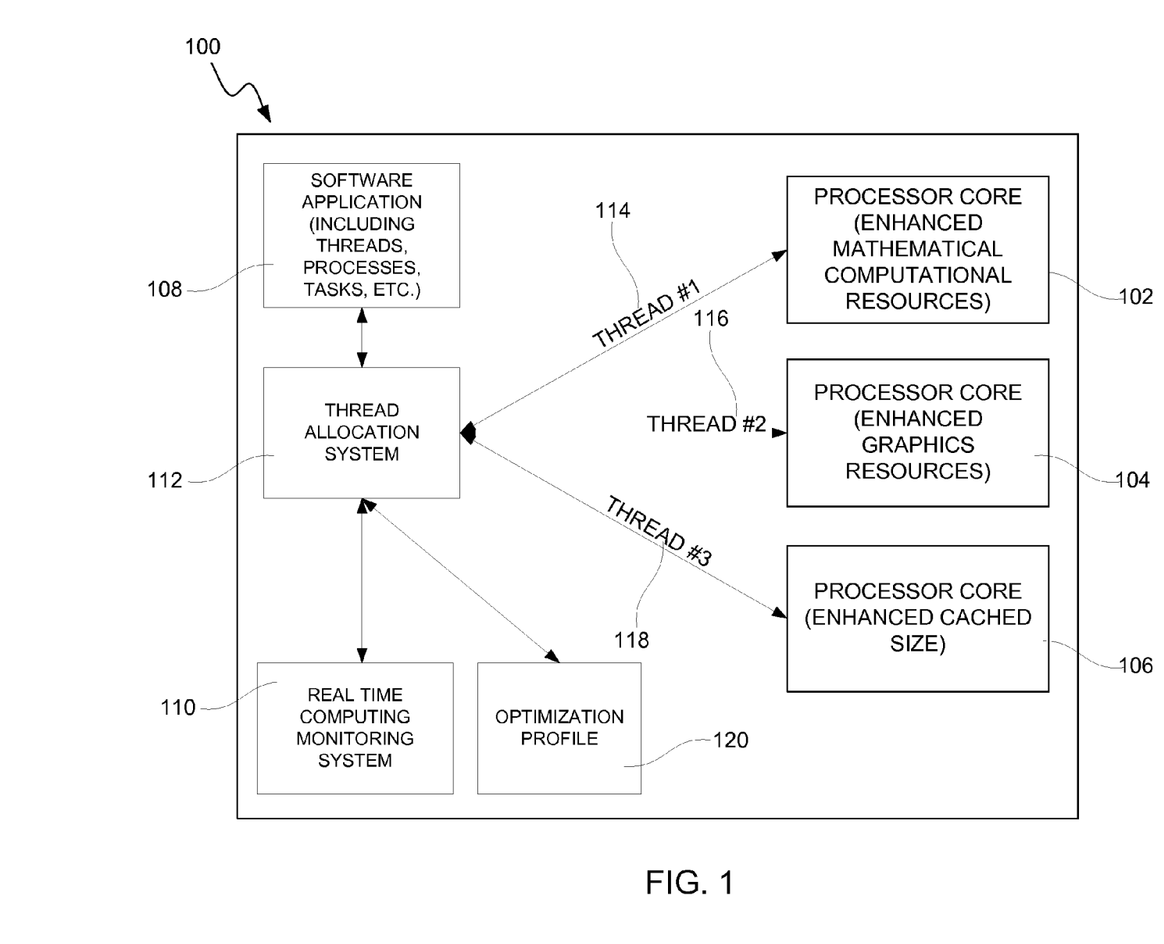
FIG. 1 is a block diagram illustrating an example multi-core system having multiple heterogeneous cores.

FIG. 1 is a block diagram illustrating an example multi-core system having multiple heterogeneous core arranged in accordance with at least some embodiments of the present disclosure. An example multi-core system 100 may include a plurality of processor cores 102, 104, and/or 106. In an example embodiment, a multi-core system 100 may include one or more cores 102, 104, and/or 106 each core having different capabilities. In other words, a multi-core system 100 may include heterogeneous hardware. For example, one core 102 may include enhanced graphics resources, another core 104 may include enhanced mathematical computational resources and another core 106 may include a large capacity cache.

As depicted in FIG. 1, a software application 108 may include several threads (or processes and/or tasks). To efficiently allocate the threads to an appropriate core based on real time computing factors, the thread allocation methods described herein may be implemented by a thread allocation system 112 operably connected to the software application 108. In some embodiments, a real time computing monitoring system 110 may also be operably coupled to the thread allocation system 112 to assist in efficiently allocating threads 114, 116 and/or 118 to one or more cores 102, 104 and/or 106, which will be described in more detail below.

In the example embodiment of FIG. 1, the thread allocation system 112 may allocate threads to an appropriate core. Specifically, the thread allocation system 112 may map a first thread (thread #1) 114 to core 102, may map a second thread (thread #2) 116 to core 104, and may map a third thread (thread #3) 118 to core 106.

In some example embodiments, a thread which may initially benefit from enhanced graphics capabilities may be initially executed on a core having enhanced graphics resources. Based at least in part on the expectation that the thread may later benefit from enhanced mathematical computational capabilities, data pertaining to the thread may be transmitted to a core having enhanced mathematical computational to complete its execution.

In some example embodiments, cores may include different instruction sets; different accelerators (e.g., DSPs (digital signal processors) and/or different SSEs (streaming SIMD (single instruction, multiple data) extensions)); larger and/or smaller caches (such as L1 and L2 caches); different branch predictors (the parts of a processor that determine whether a conditional branch in the instruction flow of a program is likely to be taken or not); and/or the like. Based at least in part on these and/or other differences between cores, different cores may provide different capabilities for certain tasks.

In some example embodiments, threads may be allocated (utilizing the thread allocation system 112, for example)to individual cores based at least in part on the hardware capabilities of the cores. For example, a thread associated with a large L1 cache (memory) demand may be allocated to a core including large L1 cache hardware. Similarly, a thread associated with a large SSE (instruction set) demand may be allocated to a core including native SSE hardware implementation. These examples are non-limiting, and it will be understood that threads may be allocated based at least in part on any hardware characteristic, instruction set, and/or other characteristic of a core and/or a thread. Further, the present disclosure contemplates that, if the threads are not allocates to a core based on hardware capabilities, the thread may instead be processed using software emulation, which may increase processing time for that thread.

In some example embodiments, determining whether to allocate a thread to a different core and/or when to perform such an allocation may include evaluating of at least a portion of an execution profile that may include data related to a prior execution of the thread. In some example embodiments, the execution profile may be generated using a freeze-dried ghost page execution profile generation method as disclosed in U.S. Patent Application Publication No. 2007/0050605, which is incorporated by reference. This method may use a shadow processor, or in some embodiments a shadow core, to simulate the execution of at least a portion of a thread in advance and to generate performance statistics and measurements related to this execution.

In some example embodiments, processors and/or caches may be configured to collect information as a program executes. For example, such information may include which cache lines the program references. In some example embodiments, data about cache usage may be evaluated to determine which threads should be replaced (e.g., by counting the number of lines of thread process remaining). In an example embodiment, a performance counter may be configured to track line evictions of running threads and/or may use that information to decide which tasks may be flushed out to begin a higher priority task. A performance counter may also be configured to track the line evictions since a task has started.

An example multi-core system may include a performance counter adapted for use in accordance with the present disclosure. Various cores may be operatively coupled to a performance counter. A performance counter may be configured to store a count indicating the number of hardware-related activities within a computer system, for example. Thread allocation (from one core to another core, for example) may be at least partially determined using data collected by the performance counter.

Some example embodiments may consider the size of a cache footprint for a particular task. In some example embodiments, Bloom filters may be used to characterize how big the cache footprint is for a thread. An example Bloom filter may be a space-efficient probabilistic data structure that may be used to test whether an element is a member of a set. When using some example Bloom filters, false positives are possible, but false negatives are not. In some example Bloom filters, elements may be added to the set, but may not be removed (though this can be addressed with a counting filter). In some example Bloom filters, the more elements that are added to the set, the larger the probability of false positives. An empty Bloom filter may be a bit array of m bits, all set to 0. In addition, k different hash functions may be defined, each of which may map or hash some set element to one of the m array positions with a uniform random distribution. To add an element, the element may be fed to each of the k hash functions to get k array positions. The bits at these positions may be set to 1. To query for an element (e.g., to test whether it is in the set), the element may be fed to each of the k hash functions to get k array positions. In some example Bloom filters, if the bit at any of these positions is 0, then the element is not in the set; if the element was in the set, then all of the bits at the k array positions would have been set to 1 when it was inserted. In some example Bloom filters, if all of the bits at the k array positions are 1, then either the element is in the set, or the bits were set to 1 during the insertion of other elements.

In some example embodiments, a Bloom filter may be used to track which portions of the cache are being used by the current thread. For example, the filter may be emptied when the thread is first scheduled onto the core. Each time a cache line is used by the thread, it may be added to the filter set. A sequence of queries may be used to estimate the thread footprint in order to evaluate the cost of cache data migration. In some example embodiments, a simple population count of the number of "1" bits in the filter may be used to estimate the cache footprint of the thread. In some example embodiments, counting Bloom filters may be used. In a counting Bloom filter, each filter element may be a counter which may be incremented when a cache line is used by the thread and may be decremented when the cache line is invalidated.

In some example embodiments, the cache data for a thread migration may be pre-fetched. The prefetching may be performed by a hardware prefetcher as is known in the art. One such prefetcher is disclosed in U.S. Pat. No. 7,318,125, which is incorporated by reference. That is, when the system is preparing to transmit a thread to a new core, references from the current core may be sent to the new core to prepare for the migration. Thus, the new core may be "warmed up" in preparation for the migration. In some embodiments, substantially all of the data relating to the thread to be migrated may be pre-fetched by the new core. In some other example embodiments, a portion of the data relating to the thread to be migrated may be pre-fetched by the new core. For example, the cache misses, hits, and/or line evictions may be pre-fetched. In some example embodiments, rather than caching the data in the new core (and thereby filling up the new core with data that may ultimately not be required), the data may be pre-fetched to a side/stream buffer, for example.

As used herein, "cache hit" may refer to a successful attempt to reference data that has been cached, as well as the corresponding data. As used herein, "cache miss" may refer to an attempt to reference data that has not been found in the cache, as well as the corresponding data. As used herein, "line eviction" may refer to removing a cached line from the cache, such as to make space for different data in the cache. Line eviction may also include a write-back operation whereby modified data in the cache is written to main memory or a higher cache level prior to being removed from the cache.

Figure 2:
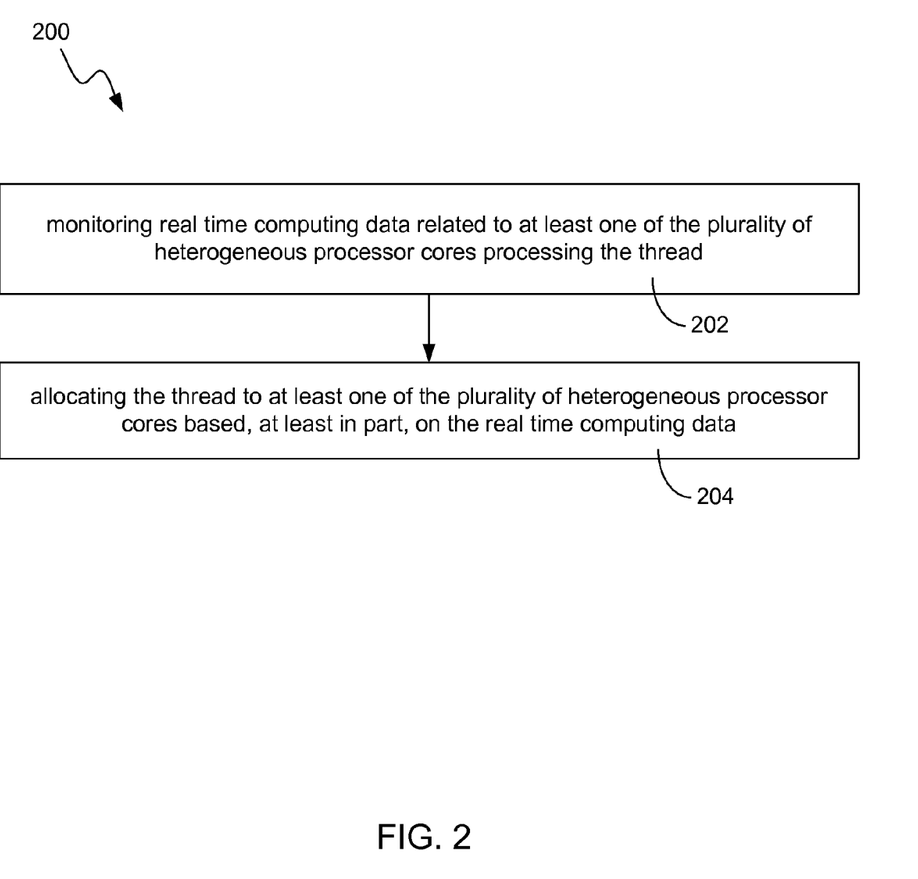
FIG. 2 is a flowchart depicting an example method of allocating a thread to at least one of a plurality of heterogeneous processor cores.

FIG. 2 is a flowchart depicting an example method 200 of allocating a thread to at least one of a plurality of heterogeneous processor cores that is arranged in accordance with at least some embodiments of the present disclosure. Example methods 200 may include one or more of processing operations 202 and/or 204. Processing may begin at operation 202, which may include monitoring real time computing data related to one or more heterogeneous processor cores, each adapted for processing the thread. Processing may flow from operation 202 to operation 204. Operation 204 may include allocating the thread to one or more of the heterogeneous processor cores based, at least in part, on the monitored real time computing data.

In some embodiments, the monitoring operation 202 may include determining if the thread is falling behind a thread completion target deadline, and the allocating operation 204 may be based, at least in part, on whether the thread has fallen behind the thread completion target deadline. In some other embodiments, the real time computing data may include a determination that the thread is falling behind a thread completion target deadline.

In some embodiments, the monitoring operation 202 (which may be performed by separate hardware on another processor core) may occur concurrently with thread processing or may occur intermittently (i.e., occurring at checkpoints or scheduling interrupts). The thread may either be executing or suspended (i.e., paused) at any time. In some examples, the thread may have a deadline for completion and may likely be executing on one core until such time as it is reallocated to another. In some embodiments, real-time data may be evaluated concurrently. In some examples, the thread may be suspended, the real-time data may be evaluated, and the thread may be reallocated to the same core or a different core.

In an example embodiment, the real time computing data may include a cycles per instruction rate, which may be determined, at least in part, as a ratio of total number of clock cycles per instruction completed over a predetermined time interval. In another example embodiment, the cycles per instruction rate may be compared to a target cycles per instruction rate, and the allocating operation 204 may be based, at least in part, on the comparison of the cycles per instruction rate to the target cycles per instruction rate. In still another example embodiment, the allocating operation 204 may occur dynamically.

In yet another embodiment, the real time computing data may include at least one checkpoint instructing that the thread is to be allocated from one heterogeneous processor core to another heterogeneous processor core at a predetermined time, and the allocating operation 204 may be based, at least in part, on the at least one checkpoint.

In another embodiment, the method 200 may further include transmitting the real time computing data to a thread allocating software tool. The thread allocating software tool may be configured to allocate the thread to a predetermined heterogeneous processor core. In another embodiment, the thread may be a plurality of threads, where each of a plurality of threads may be associated with the real time computing data, and where each of the threads may be independently allocated to the heterogeneous processor cores.

Figure 3:
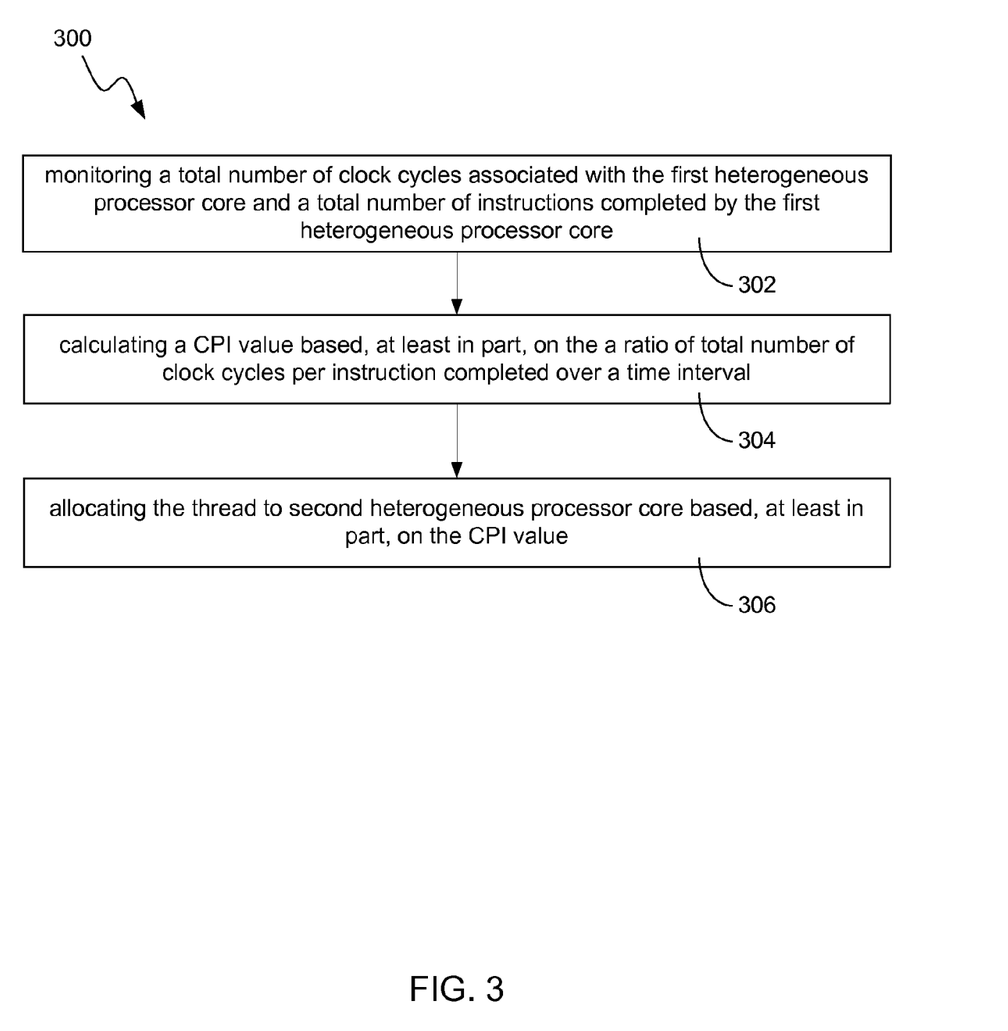
FIG. 3 is a flowchart depicting an example method of allocating a thread from a first heterogeneous processor core to a second heterogeneous processor core.

FIG. 3 is a flowchart depicting an example method 300 of allocating a thread from a first heterogeneous processor core to a second heterogeneous processor core that is arranged in accordance with at least some embodiments of the present disclosure. The example methods 300 may include one or more of processing operations 302, 304 and/or 306.

Processing may begin at operation 302, which may include monitoring one or more of a total number of clock cycles associated with the first heterogeneous processor core processing the thread and/or a total number of instructions completed by the first heterogeneous processor core. Processing may continue from operation 302 to operation 304, which may include calculating a cycles per instruction (CPI) value based, at least in part, on a ratio of a total number of clock cycles per instruction completed over a time interval. Processing may then continue from operation 304 to operation 306, which may include allocating the thread to second heterogeneous processor core based, at least in part, on the CPI value.

In an example embodiment, the method may further include comparing the CPI value to a target CPI value prior to the allocating operation 306, where the allocating operation 306 may be based, at least in part, on the CPI value approximately equaling the target CPI value. In another embodiment, the method may further include comparing the CPI value to a target CPI value prior to the allocating operation 306, where the allocating operation 306 may be based, at least in part, on the CPI value exceeding the target CPI value.

In another embodiment, the target CPI value may be defined prior to or during the execution of a software application associated with the thread.

In yet another embodiment, the real time computing data may include one or more checkpoints configured to instruct that the thread is to be allocated from one heterogeneous processor core to another heterogeneous processor core at a predetermined time. In this manner, the allocating operation 306 may be based, at least in part, on the predetermined time associated with the at least one checkpoint.

Figure 4:
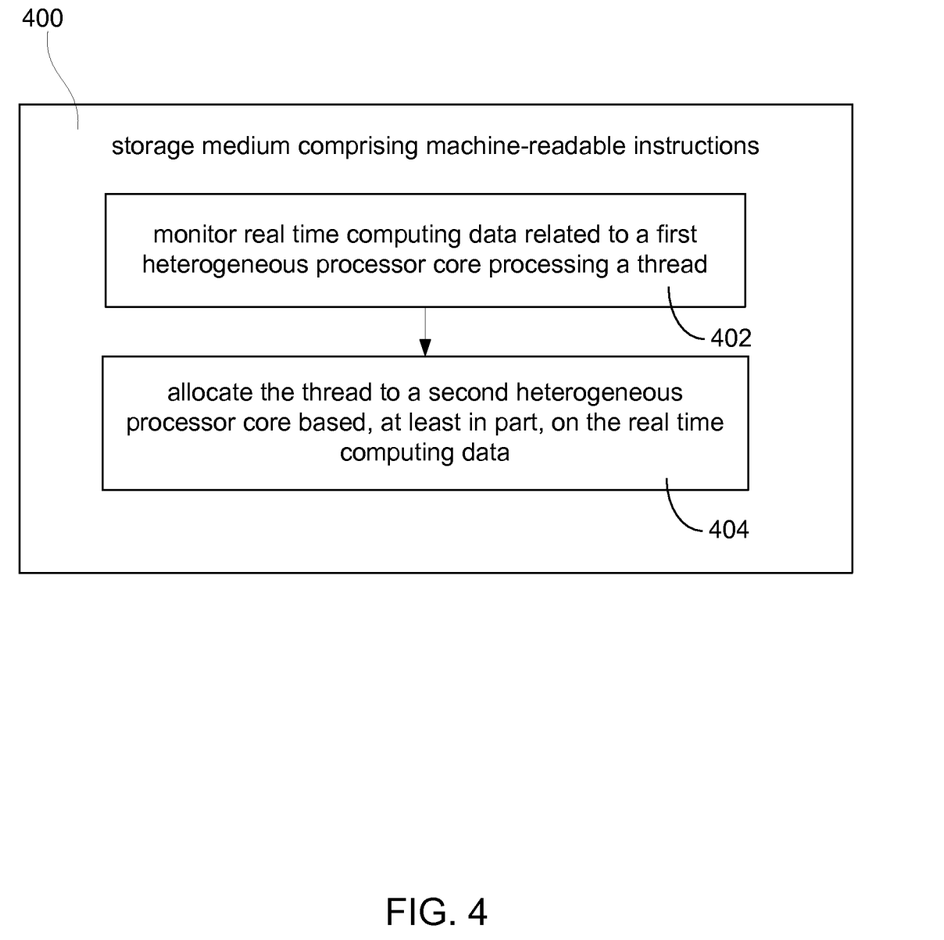
FIG. 4 is a schematic diagram illustrating an example article including a storage medium comprising machine-readable instructions.

FIG. 4 is a schematic diagram of an example article including a storage medium 400 comprising machine-readable instructions arranged in accordance with at least some embodiments of the present disclosure. When executed by one or more processing units, the machine readable instructions may operatively enable a computing platform to monitor real time computing data related to a first heterogeneous processor core processing a thread (operation 402); allocate the thread to a second heterogeneous processor core based, at least in part, on the real time computing data (operation 404).

In some embodiments, the machine-readable instructions may be further configured to operatively enable a computing platform to determine if the thread is falling behind a thread completion target deadline. In this manner, the allocating operation 404 may be based, at least in part, on whether the thread has been fallen behind the thread completion target deadline.

In another embodiment, the article may further include a thread allocating software tool configured to receive the real time computing data. The thread allocating software tool being may be configured to allocate the thread to a predetermined heterogeneous processor core.

In some embodiments, the machine-readable instructions may be further configured to operatively enable a computing platform to dynamically allocate the thread to another heterogeneous processor core based, at least in part, on the monitored real time computing data.

In some embodiment, a multi-core processor may include a first heterogeneous processor core and a second processor core. Such a multi-core processor may be configured to monitor real time computing data related to the first heterogeneous processor core processing a thread, allocate the thread to the second heterogeneous processor core based, at least in part, on the monitored real time computing data, and execute the thread by the second heterogeneous processor core after the thread is allocated to the second heterogeneous processor core.

Figure 5:
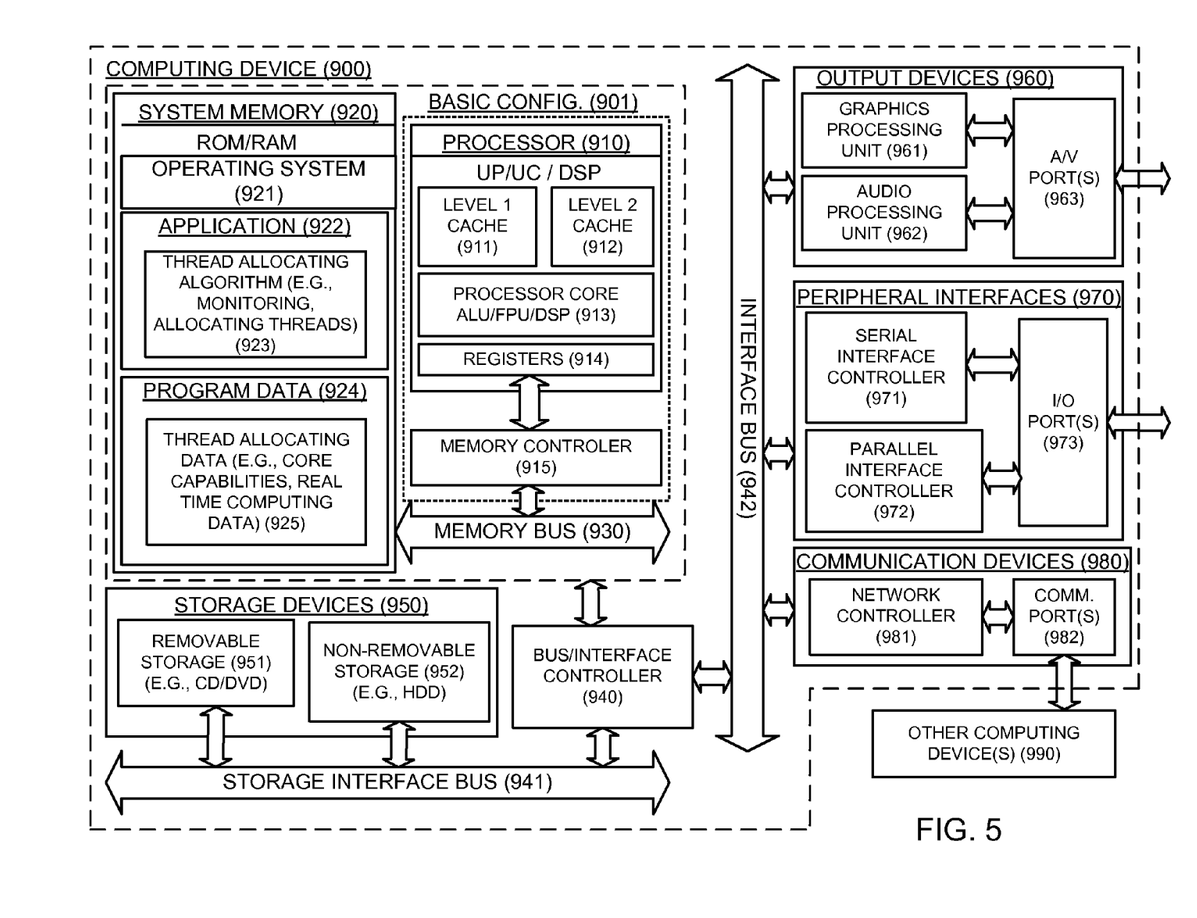
FIG. 5 is a block diagram illustrating an example computing device that may be arranged for thread allocating implementations, all configured in accordance with at least some embodiments of the present disclosure.

FIG. 5 is a block diagram illustrating an example computing device 900 that is arranged for thread allocation in accordance with at least some embodiments of the present disclosure. In a very basic configuration 901, computing device 900 may typically include one or more processors 910 and system memory 920. A memory bus 930 can be used for communicating between the processor 910 and the system memory 920.

Depending on the desired configuration, processor 910 can be of any type including but not limited to a microprocessor (μP), a microcontroller (μC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 may include a thread allocating algorithm 923 that may be arranged to monitor real time computing data and allocate a thread to at least one heterogeneous hardware component based, at least in part, on the monitored real time computing data. Program Data 924 may include thread allocation data 925 that may be useful for allocating the thread to an appropriate heterogeneous hardware component. In some embodiments, application 922 can be arranged to operate with program data 924 on an operating system 921 such that a thread may be efficiently allocated in accordance with the various methods described herein. This described basic configuration is illustrated in FIG. 5 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which can be arranged to facilitate communications with one or more other computing devices 990 over a network communication via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to allocate a thread to a plurality of processor cores, the method comprising:
    allocating the thread to a first core of the plurality of processor cores;
    monitoring computing data related to the first core, wherein the computing data comprises a cycles per instruction rate based on a ratio of total number of clock cycles per instruction completed over a time interval;
    determining, based on the monitoring, that the thread is falling behind a thread completion target deadline by comparing the cycles per instruction rate to a target cycles per instruction rate;
    associating the thread with a phase of a plurality of phases of a thread execution;
        wherein each phase of the plurality of phases is associated with operating requirements of a specific task related to each phase; and
        wherein each phase is identified by a particular breakpoint in the thread execution or a particular point where the thread execution switches from a first task to a second task;
    identifying a current phase of the thread execution;
    allocating the thread to a second core of the plurality of the processor cores based, at least in part, on the determination that the thread is falling behind a thread completion deadline and based, at least in part, on the identification of the current phase of the thread execution.

2. The method of claim 1, further comprising: executing the thread by the second core.

3. The method of claim 1, wherein allocating the thread to the second core comprises dynamically allocating the thread to the second core.

4. The method of claim 1, further comprising:
    transmitting the monitored computing data to a thread allocating software tool, and wherein allocating the thread to the second core comprises allocating the thread with the thread allocating software tool based on the monitored computing data.

5. The method of claim 1, wherein the computing data comprises one or more checkpoints that instruct the thread to be allocated from the first core to the second core at a particular time, wherein allocating the thread to the second core is based, at least in part, on the one or more checkpoints.

6. The method of claim 1,
    wherein allocating the thread to the second core is based, at least in part, on the cycles per instruction rate being equal to the target cycles per instruction rate.

7. The method of claim 1,
    wherein allocating the thread to the second core is based, at least in part, on the cycles per instruction rate being in excess of the target cycles per instruction rate.

8. The method of claim 6, wherein the target cycles per instruction rate is defined prior to the execution of a software application associated with the thread.

9. The method of claim 6, wherein the target cycles per instruction rate is defined during the execution of a software application associated with the thread.

10. The method of claim 1, further comprising
    allocating the thread to the second core based, at least in part, on a particular time associated with at least one checkpoint.

11. An article comprising:
    a non-transitory storage medium comprising machine-readable instructions stored thereon, which, in response to execution by one or more processor units, operatively enable a computing platform to:
    allocate a thread to a first core of a plurality of processor cores;
    monitor computing data related to the first core, wherein the computing data comprises a cycles per instruction rate based on a ratio of total number of clock cycles per instruction completed over a time interval;
    determine, based on the monitored computing data, that the thread is falling behind a thread completion target deadline by comparison of the cycles per instruction rate to a target cycles per instruction rate;
associate the thread with a phase of a plurality of phases of a thread execution;
  wherein at least one phase of the plurality of phases is associated with operating requirements of a specific task related to the at least one phase; and
  wherein the at least one phase is identified by a particular breakpoint in the thread execution or a particular point where the thread execution switches from a first task to a second task;
identify a current phase of the thread execution;
allocate the thread to a second core different from the first core based, at least in part, on the determination that the thread is falling behind the thread completion target deadline and based, at least in part, on the identification of the current phase of the thread execution.

12. The article of claim 11, further comprising:
a thread allocating software tool configured to receive the computing data, the thread allocating software tool being configured to allocate the thread to the second core based at least in part on the computing data.

13. The article of claim 11, wherein to allocate the thread to the second core, the machine-readable instructions are executable to enable the computing platform to dynamically allocate the thread to the second processor core based, at least in part, on the monitored computing data.

14. A computing device that includes a multi-core processor, comprising:
a first processor core of the multi-core processor;
a second processor core of the multi-core processor; and
a memory coupled to the first and second processor cores and including an application, wherein the application is configured to:
allocate a thread to the first processor core;
monitor computing data related to the first processor core during execution of the thread by the first processor core to determine, based on the monitored computing data, that the thread is falling behind a thread completion target deadline,
associate the thread with a phase of a plurality of phases of a thread execution;
  wherein at least one phase of the plurality of phases is associated with operating requirements of a specific task related to the at least one phase; and
  wherein the at least one phase is identified by a particular breakpoint in the thread execution or a particular point where the thread execution switches from a first task to a second task;
identify a current phase of the thread execution; and
allocate the thread to the second processor core based, at least in part, on the determination that the thread is falling behind the thread completion target deadline and based, at least in part, on the identification of the current phase of the thread execution, and
  wherein the second processor core is configured to execute the thread after the thread is allocated to the second processor core.

15. The computing device of claim 14, wherein the first processor core has a first capability and the second processor core has a second capability that is different from the first capability such that the multi-core processor comprises hardware.

16. The computing device of claim 15, wherein each of the first capability and the second capability corresponds to at least one of: a graphics resource, a mathematical computational resource, an instruction set, an accelerator, an SSE (streaming SIMD (single instruction, multiple data) extensions), a cache size and/or a branch predictor.

* * * * *

UNITED STATES PATENT AND TRADEMARK OFFICE
CERTIFICATE OF CORRECTION

| | | |
|---|---|---|
| PATENT NO. | : 8,881,157 B2 | Page 1 of 1 |
| APPLICATION NO. | : 12/557971 | |
| DATED | : November 4, 2014 | |
| INVENTOR(S) | : Wolfe et al. | |

It is certified that error appears in the above-identified patent and that said Letters Patent is hereby corrected as shown below:

In the Drawings

In Fig. 3, Sheet 3 of 5, for Tag "304", in Line 1, delete "on the a" and insert -- on a --, therefor.

In Fig. 5, Sheet 5 of 5, delete "UP/UC/DSP" and insert -- µP/µC/DSP --, therefor.

In Fig. 5, Sheet 5 of 5, in Box "(915)", in Line 1, delete "MEMORY CONTROLER" and insert -- MEMORY CONTROLLER --, therefor.

In the Claims

In Column 10, Line 51, in Claim 10, delete "comprising" and insert -- comprising: --, therefor.

Signed and Sealed this
Twenty-eighth Day of April, 2015

Michelle K. Lee
*Director of the United States Patent and Trademark Office*